United States Patent [19]

Burl et al.

[11] Patent Number: 6,011,596
[45] Date of Patent: Jan. 4, 2000

[54] VIDEO IMAGE MOTION COMPENSATION USING AN ALGORITHM INVOLVING AT LEAST TWO FIELDS

[75] Inventors: Michael Burl, Twickenham; Roderick Thomson, Richmond; Phillip Layton, Sutton, all of United Kingdom

[73] Assignee: British Broadcasting, London, United Kingdom

[21] Appl. No.: 08/871,925

[22] Filed: Jun. 11, 1997

Related U.S. Application Data

[60] Continuation of application No. 08/296,118, Aug. 25, 1994, abandoned, which is a division of application No. 07/969,848, Mar. 3, 1993, abandoned.

[30] Foreign Application Priority Data

May 24, 1991 [GB] United Kingdom .................. 91 11348
Sep. 3, 1991 [GB] United Kingdom .................. 91 18781

[51] Int. Cl.$^7$ ...................................................... H04N 7/24
[52] U.S. Cl. ............................................................ 348/699
[58] Field of Search ...................................... 348/699, 700, 348/701, 416, 402, 390, 384; H04N 7/133, 7/137

[56] References Cited

U.S. PATENT DOCUMENTS

| | | | |
|---|---|---|---|
| 4,862,259 | 8/1989 | Gillard et al. ........................... | 348/699 |
| 4,890,160 | 12/1989 | Thomas ................................... | 358/105 |
| 4,992,869 | 2/1991 | Samad et al. ............................ | 348/699 |
| 5,162,907 | 11/1992 | Keating .................................. | 348/701 |
| 5,185,819 | 2/1993 | Ng et al. ................................. | 348/409 |

FOREIGN PATENT DOCUMENTS

| | | |
|---|---|---|
| 0 132 832 | 2/1985 | European Pat. Off. . |
| 0 132 832 A2 | 2/1985 | European Pat. Off. . |
| 0 236 519 | 9/1987 | European Pat. Off. . |
| 2 231 225 | 11/1990 | United Kingdom . |
| 2 231 226 | 11/1990 | United Kingdom . |
| 2 231 227 | 11/1990 | United Kingdom . |
| 2 231 743 | 11/1990 | United Kingdom . |
| 2231743 | 11/1990 | United Kingdom . |
| 2249906 | 5/1992 | United Kingdom . |
| 2188510 | 9/1997 | United Kingdom . |
| WO 87/05769 | 9/1987 | WIPO . |
| WO 88/10046 | 12/1988 | WIPO . |
| WO 91/01622 | 2/1991 | WIPO . |
| WO 91-020155-A1 | 12/1991 | WIPO . |
| WO 92-005662-A1 | 4/1992 | WIPO . |
| WO/92/05662 | 4/1992 | WIPO . |
| WO 93-019430-A1 | 9/1993 | WIPO . |

OTHER PUBLICATIONS

Fernando et al., "Motion Compensated Display Conversion," in *Proceedings of the Second International Workshop on Signal Processing of HDTV,* pp. 393–399, North–Holland (1988).

Cafforio et al., "Motion Compensated Image Interpolation," *IEEE Transactions on Communications,* vol. 38, No. 2, pp. 215–222 (Feb. 1990).

Cafforio, et al., "Motion Compensated Image Interpolation", IEEE Transactions on Communications, vol. 38, No. 2, Feb. 1990, pp. 215–222.

Fernando, et al., "Motion Compensated Display Conversion", Proceedings of the Second Internaional Workshop on Signal Processing of HDTV, L'Aguila, IT, Feb. 1988, pp. 393–399.

*Primary Examiner*—Bryan Tung
*Attorney, Agent, or Firm*—George W. Neuner

[57] ABSTRACT

In a method of video image motion compensation a plurality of motion vectors are derived by techniques such as phase correlation between pairs of images. In order to produce a set of motion vectors which can be used to define substantially all the motions in an input image, sets of vectors are derived from comparisons with preceding and succeeding images and are then combined to produce a set of vectors for assignment to an input image. Once the set of vectors has been derived they are assigned to the input image from where they can be projected to produce a desired output image. The vectors are assigned to individual elemental areas of the image and certain elemental areas have two (or more) vectors assigned to them.

30 Claims, 6 Drawing Sheets

VIDEO IMAGE MOTION COMPENSATION USING AN ALGORITHM INVOLVING AT LEAST TWO FIELDS

This application is a continuation of application Ser. No. 08/296,118 filed on Aug. 25, 1994, now abandoned.

BACKGROUND OF THE INVENTION

This invention relates to video image processing, and more particularly to the derivation and assignation of motion vectors indicating the direction and magnitude of current movement to different regions of a video image, in order to assist the generation of desired output images.

Our United Kingdom Patent No. GB-B-2188510 describes a method of producing a list of motion vectors which are applicable over the whole area of a video image and for assigning an appropriate one of the motion vectors in the list to each region of the image. Other methods are possible for generating such lists of motion vectors. The regions to which the vectors are applied may be as small as an individual picture element (pixel) or may comprise a plurality of pixels i.e. a block of the picture.

Such motion vectors are particularly useful when it is desired to generate output video fields which correspond to an instant in time intermediate of two input fields. Such output fields are necessary in video image processing systems which transfer video images to or from film, in standards conversion, or in producing slow notion effects.

In all such applications it is desirable to produce a sharp smoothly moving picture. In the case of slow motion generation, if the technique is used with, for example, a shuttered CCD camera then pictures can be generated with a quality which approaches that obtainable from a high frame rate camera. One possible technique for generating the list of motion vectors and then assigning them to individual picture elements has been proposed in our International Patent Application No. WO-A-9205662 and also in our International Patent Application No. PCT/GB91/01622. This technique is known as the four field algorithm and uses a total of four input fields for assignment of an output vector field. It has been found that for certain types of motion and in particular rotational motion this type of system does not always produce satisfactory results.

Another prior art system is described in British Patent Application No. GB-A-2231743. In this a list of trial vectors is derived using a block matching technique between a pair of fields designated $F_1$ and $F_2$. This list or menu of vectors is then applied across a three field interval $F_1$ to $F_4$ in order to create a vector field at the instant in time of a desired output vector field. This technique also has problems because vectors are assigned at the output vector field without necessarily taking account of whether or not an object represented by that vector is present in both of the adjacent fields. Thus errors in outputs fields can occur. Also, when the next interval is used ($F_2$ to $F_3$) a new set of vectors has to be derived for $F_2$ and subsequently assigned. This leads to extra calculation and an increase in complexity.

SUMMARY OF THE INVENTION

We have appreciated that for a sequence of three video images any object which occurs in an input field will be present in either the previous input video field or the following input video field. Thus all the information required to generate an intermediate output field is present in these three fields. Thus the only way to ensure that vectors are correctly assigned when generating output fields is to assign the vectors specifically to the input fields prior to generating output fields. Two techniques for producing the necessary vector menus and assigning them to input fields prior to the derivation of output fields are described in this application. These are referred to as the three field algorithm and the two field algorithm because of the manner in which they operate.

The present invention is defined in the appended claims to which reference should now be made.

DETAILED DESCRIPTION OF PREFERRED EMBODIMENTS

The invention will now be described in detail by way of example with reference to the accompanying figures in which.

The three field vector assignment method referred to above will first be described.

Figure 1:
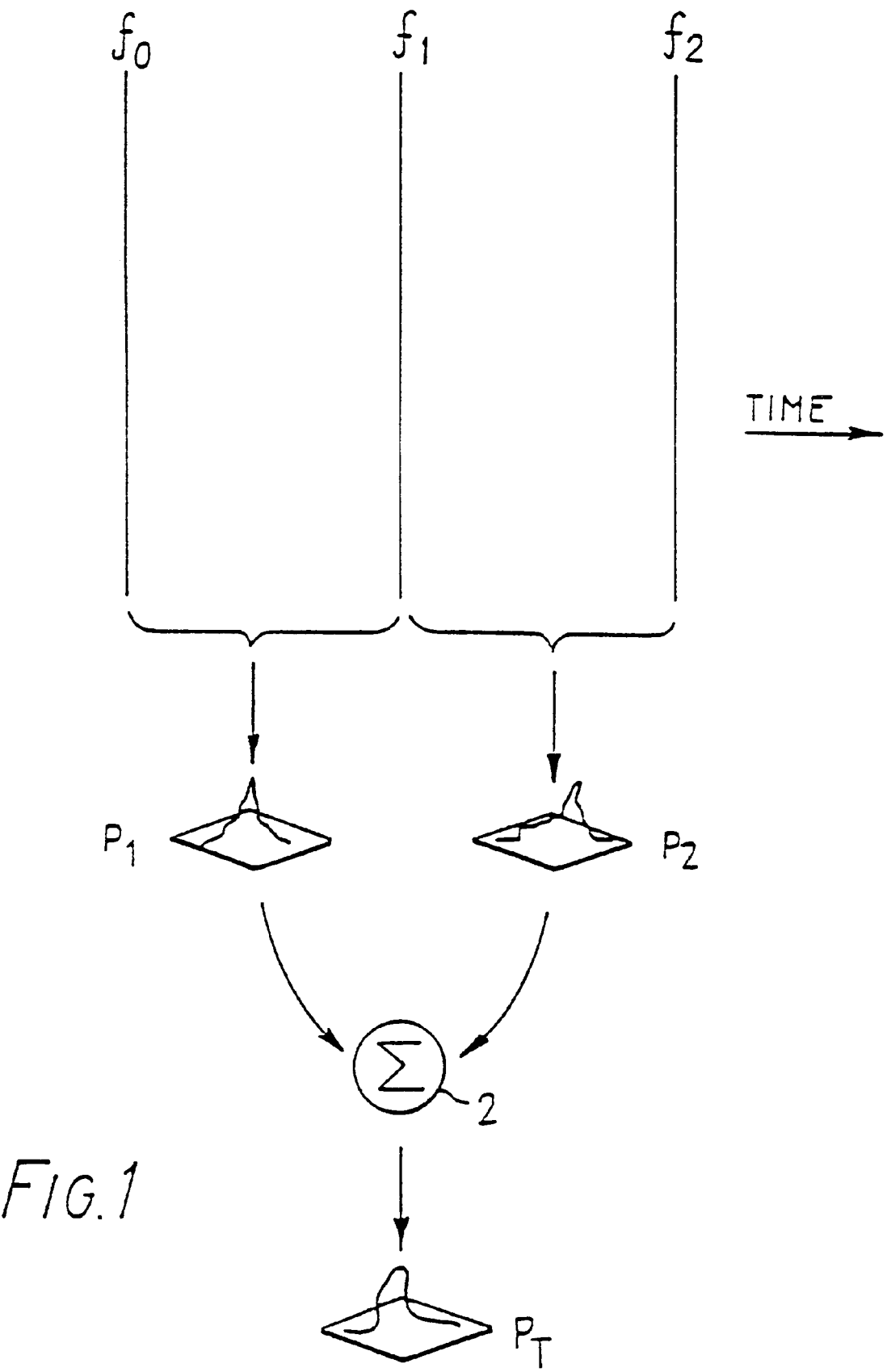
FIG. 1 is a diagram illustrating the derivation of a correlation surface by the three field algorithm.

The three field vector assignment method is described with reference to FIG. 1 which shows three time displaced fields, $f_0$, $f_1$, and $f_2$ at times $t_0$, $t_1$ and $t_2$.

Using a method of the type set out in our UK Patent No. GB-B-2188510 and corresponding U.S. Pat. Nos. 4,873,573 (October 1989), 4,890,160 (December 1989), and 4,942,466 (July 1990), a fast Fourier transform based phase correlation method, a phase correlation surface $P_1$ is derived to represent the vector field defining the differences between fields $f_0$ and $f_1$. A second correlation surface $P_2$ is derived to represent the differences between $f_1$ and $f_2$. These correlation surfaces are derived for each of a plurality of blocks of the input fields $F_0$, $F_1$ and $F_2$. Typically the input picture is divided into 108 blocks arranged as 9 rows of 12 blocks prior to phase correlation. Other permutations are obviously possible. The phase correlation is performed between the same block of two successive sequential fields, $f_0$ and $f_1$.

After correlation surfaces $P_1$ and $P_2$ have been derived for corresponding blocks in $f_0$ and $f_1$, and $f_2$ they are temporally filtered by being added together in a summer 2. This produces a correlation surface PT which can be used to assign vectors to input field $f_1$. This surface PT will include information about objects which are present in all three fields as well as objects which are present in only $f_0$ and $f_1$ or $f_1$, and $f_2$. Thus it should be possible to assign a vector to every picture area in $f_1$.

A vector menu is derived from PT prior to assignment of vectors to $f_1$ by searching to locate the peaks in the correlation surface. A list of up to, for example, five peaks above a pre-set threshold is selected to form a menu of trial vectors for assignment to picture areas in the block in $f_1$ from which the surface was derived.

Before the menu of trial vectors is assigned to $f_1$ it is analysed for pan and zoom components and suitable adjustments are made. Techniques for making these adjustments are described in our British Patent Application No. 9206396.5

This thus derived vector menu should include a vector which uniquely describes the motion between $f_0$ and $f_1$, and $f_1$ and $f_2$ for every pixel in $f_1$.

It is the purpose of the assignment to produce vectors assigned to the pixels of $f_1$ which can be used to contribute to the derivation of an output field between either $f_0$ and $f_1$, or $f_1$ and $f_2$ by projecting the data of that pixel to the time position of the output field. One method for assigning these vectors is described in our International Patent Application No. WO-A-9205662. In this a vector is assigned to a pixel in $f_1$ in accordance with that vector in the trial vector list which gives the lowest total error (match error) in deriving the projection of that pixel with that vector onto $f_2$ and onto $f_0$. Problems with such assignment occurs when foreground objects are moving and consequently revealing and obscuring portions of background the image between fields. Some proposals for dealing with these have been set out in our International Patent Application No. WO-A-9205662 in relation to the four field algorithm and modifications of these can be used with assignment of vectors derived using the three field algorithm.

Figure 2:
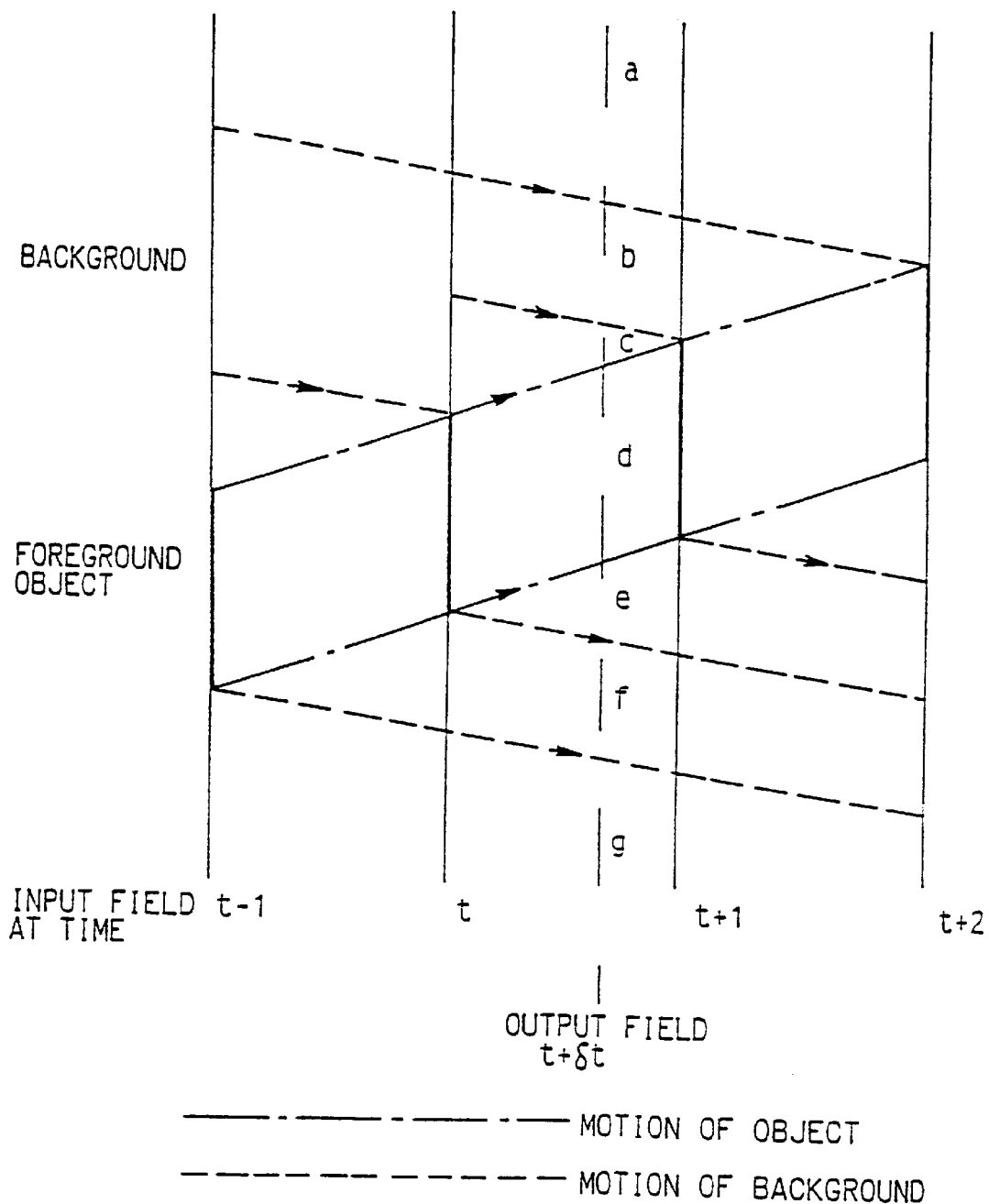
FIG. 2 is a diagram illustrating movement of foreground and background as between a sequence of four successive fields.

In a scene of foreground objects moving in front of background objects it is assumed that the foreground object obscures the background. The movement of the foreground object is continuously covering and revealing background. In a sequence of three fields everything that is visible in the centre field should be in either the previous field, the next field, or both. This is shown in FIG. 2. The exception to this rule is the window effect caused by a hole in the foreground that shows something completely different in every field.

The three field algorithm is used to produce a list of trial vectors and using these every element of a picture can be assigned in one of the following ways:

a) Foreground object; low match error in centre field period b) Obscured background; low match error in previous field period if assigning field 1 c) Revealed background; low match error in next field period if assigning field 2 d) Missing vector/window problem; no good match

Three field assignment creates a vector field and status field co-timed with an input field. If an input timed vector field is available for two successive input fields then the creation of an intermediate output field is a logical problem. Of course, if a vector is missing from the menu then an area of the picture is destined to be created using a fallback mode and is not motion compensated.

Multiple Vector Assignment

In accordance with this method of assignment the vector selection process is extended to allow up to two vectors to be generated for each output pixel in regions of revealed and obscured background. This allows a soft switch between vectors used for image interpolation at junctions between foreground and background objects. For example, for each pixel that is assigned as revealed background (i.e. the lowest weighted assignment error occurred between the two last field), the vector giving the minimum assignment error over the first two fields is also determined. The output image is then interpolated from the following fields shifted by the assigned revealed background vector (scaled for the required output time), together with a contribution from the preceding fields shifted by this secondary vector. The relative proportion of the two contributions may be determined as follows: A control signal is calculated for each pixel to be interpolated, specifying the fraction of the output image to be taken from the following fields. For all samples in foreground areas, this will be a constant equal to δt in FIG. 2, this being the normal mode of operation of a temporal interpolation filter. In a region flagged as revealed background, the control signal will be set equal to unity, since all information should be taken from following fields as described earlier for region e in FIG. 3. this control signal is then subject to a low-pass spatial filter, so that it will no longer be equal to unity just inside regions of revealed background.

The picture elements that comprise the output field may then be merged together in a way that minimises hard edges. In an original source picture there is mixing together across a narrow boundary between objects. This boundary is described by the resolution. For most of the output picture the picture elements will be present in both the frame before the frame after the current output field position. The output picture is created by a weighted sum of the two input pictures. The contribution from each of the input variables is a picture size array called assn_ff.

When obscured or revealed background is in use, the output is made from one frame only. In creating the output, picture switching occurs between one-field and two-field picture creation. This switching happens twice, once between the background from one field and background from two fields, and again between background using one field and foreground created from two field.

Two picture size assigned vector fields are produced during vector assignment (called assn_V1 and assn_2). The first vector field correponds to the field immediately before the output picture time and the second to the field after. Each vector field is derived from a different menu derived for that field using the three field algorithm. When a minimum match error is found in the centre period, both vector fields are given the same value and assn_ff is made equal to the distance (dist) between field one and T0, the output field time. The output picture is calculated as a weighted average of the two fields, dependent upon assn_ff:

$$Aout = A1 \times (1 - assn\_ff) + A2 \; assn\_ff$$

assn_ff=dist, if the best match was in the preceding inter-field period

Figure 3:
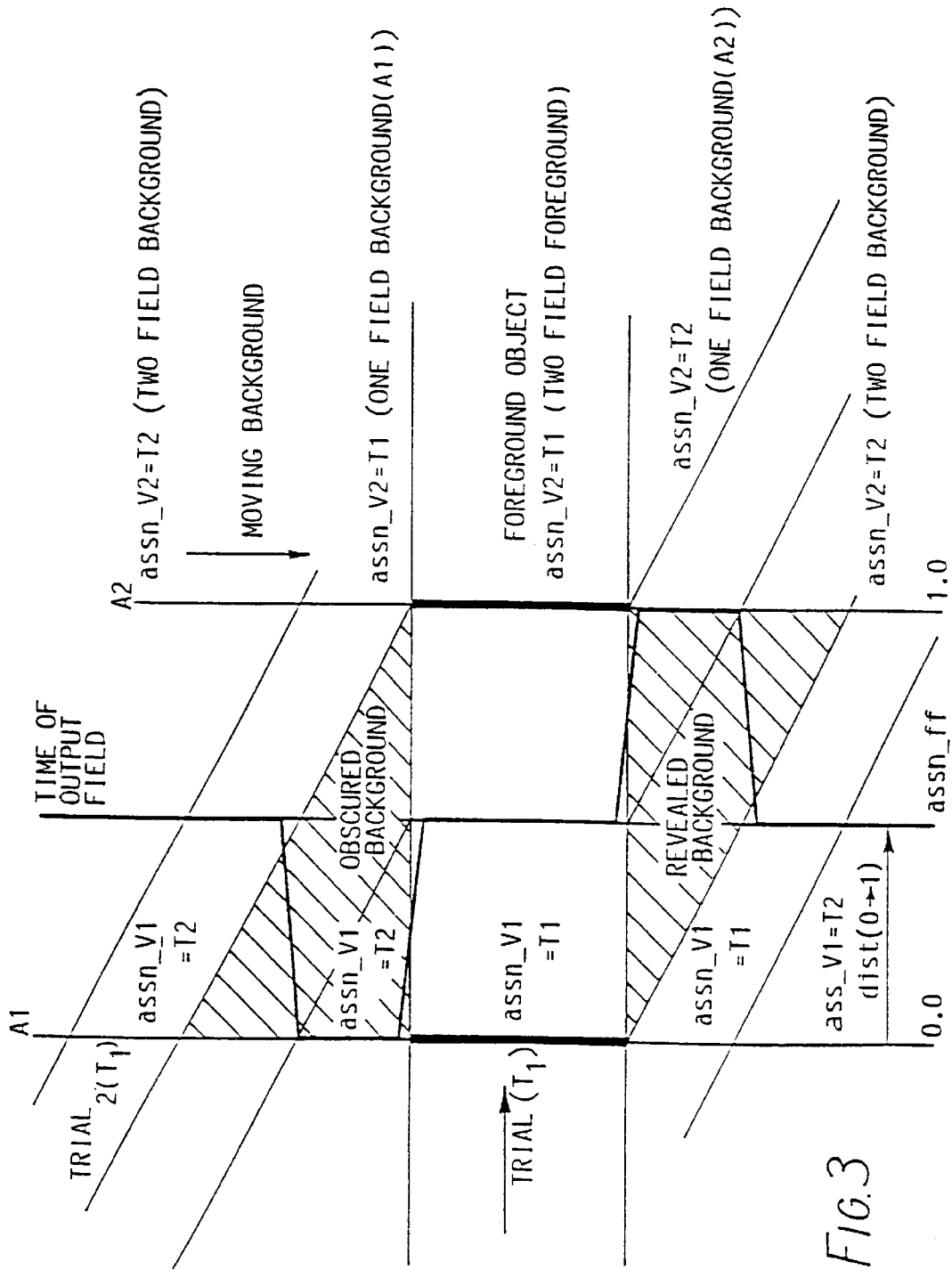
FIG. 3 is a diagram illustrating one method of vector assignment.

When the best match is in the preceding inter-field period, the best vector for that period is put into vector field assn_v1 and the best vector for the centre period is put into assn_v2. In this case assn_ff is put to 0 to force the output to be created from field 1. When the best match is in the next following inter-field period, the best vector for the centre period is put into vector field assn_v1 and teh best vector for that period is put into assn_v2. Then assn_ff is put to 1 to force the output to be created from field 2. This is illustrated in FIG. 3.

It is seen therefore that two vectors are associated with each pixel in each field; one vector is used when "looking" in the forward direction and the other vector is used when "looking in the backward direction. During obscured and revealed background one vector is pointing to the background and is used to get the background while the other vector is pointing at the foreground object. Due to the assigned values of assn_ff only one vector is used at one time until the assn_ff array is spatially filtered. A small low-pass filter on assn_ff will cause a blending together during mode changes.

The output field is thus generated pixel-by-pixel with the field before T0 being displaced by dist*assn_V1, and the field after T0 being displaced by (1−dist)*assn_V1.

It is also possible to assign a plurality of motion vectors, e.g. two, to each pixel in other circumstances. This assignment could occur at input time or at output time.

In the preferred embodiment described below the vector field co-timed with the first field is always forewards projected and the vector field co-timed with the second field is always backwards projected.

Pre-filtering

Prior to assignment the input picture is passed through a small 2D spatial filter. The impulse response of the filter is a rectangle so that the step response will be a linear ramp. When the match error is calculated from the difference between pictures the picture gradient is also calculated. When the difference is divided by the gradient the result corresponds to a positional error. This is like the gradient method of motion measurement and would be most accurate when the gradients in the picture are linear.

If the displacement is very large the method breaks down and the result is not a measure of displacement, just a large error. The method is used to simply select the best vector. A further refinement is to use the displacement measurement to correct small errors in the assigned vector.

Sub-sampled Vector Fields

The input timed vector fields are calculated for alternate pixels. The original picture is fully sampled and hence the accuracy of the match errors is not significantly affected by the subsampling but there is a considerable saving in hardware.

Match Error Calculation

The usual meaning and method for match errors may be summarised as follows:—Match errors are a means to find out if a particular vector in the vector menu applies to a particular picture element. The match error is calculated by shifting the two pictures by the proposed vector movement and then subtracting the two images. This is done for the area of the assignment block and the modulus of this error signal is divided by the picture gradient of the center picture element and then spatially filtered.

In the three field algorithm the input picture picture co-timed with required input vector field is held stationary and the previous and following picture fields are displaced by a trial vector. This has to be done for both the field before and the field after the required output time.

This results in two match errors, one before and one after the input picture. When the vector field is projected forwards the second match error corresponds to period of output picture time and a low match error will indicate foreground. This center match error is given a small preference by multiplying it by a weighting factor between 0.5 and 0.99. When the vector field is projected backward the first match error corresponds to period of output picture time and a low match error will indicate foreground. This centre field match error is weighted in the same way as before.

An additional match error is calculated by adding together the other two match errors and this is also weighted. It appears that the centre field match error and the combined two field match error are equally good at identifying foreground and hence the weighting factors are similar.

In practice the vector field co-timed with the first picture for forward projection is very similar to the vector field for the same picture when it was in the second picture position and back projected. The match error calculations are the same but the field dependent weightings are changed and hence the assigned vectors and status values. The forward projection field and backward projection vector fields are calculated at the same time but the forward vector field is delayed by one input field period.

Assignment and Status

In this scheme the input vector field is subsampled to 360 pixels and 288 field lines. For each element in the input vector field the weighted match errors are compared. The trial vector with the lowest weighted match error is assigned to that picture element.

For the forward projection vector field the status rules are as follows:

Foreground is indicated by the lowest match error being the second field or the two field average.

Obscured background is indicated by the lowest match error being the first field.

Missing motion vector is indicated by a large match error.

For the backwards projection vector field the status rules are as follows:

Foreground is indicated by the lowest match error being the first field or the two field average.

Revealed background is indicated by the lowest match error being the second field.

Missing motion vector is indicated by a large match error.

The status is stored with each assigned vector in the first and second vector fields.

Output Time Vector Field

The map of input assigned vectors may be laid over the co-timed picture to indicate which way everything is moving. The output vector field is created by projecting each element of the first input vector field forward to the output time and the second vector field backwards to the output position. Although the input vector field is subsampled the output vector field has the full 720 horizontal samples.

The output timed vector field is required at some time distance from the input vector field. This situation is shown in FIG. 3 When projecting the first vector field the location of each input timed vector is added to the assigned vector scaled by distance and this new location has the assigned vector stored. For the second vector field the location of each input timed vector is added to the assigned vector scaled by 1-distance and this new location has the assigned vector stored. A slight complication is that the projected location is unlikely to be an exact location in the output vector field and also the output vector field is more densely sampled than the input vector field. Both problems are solved by storing the vector in the location either side of the projected vector.

Status and Modes

The status of the input timed vector field follows the projected vector and a new output vector status is created. The rules for the output vector field status are as follows:

Foreground

Foreground vectors are projected forwards and backwards from both input timed vector fields. If two foreground vectors land in the same place then both vectors are stored and the status indicates two foreground vectors.

Background

Obscured background is projected forward and status marks the area as obscured background.

Revealed background is projected backward and status marks the area as revealed background.

Fall Back Mode

If an area of the picture has a large match error in either input timed vector field it is assumed that no motion vector is available. To avoid losing the object to projected background the area is marked as unassignable and goes into fallback mode. The current fallback mode is to use a stationary vector and mix the two pictures together in proportion to position of the output field in relation to the input fields. A softer resolution picture is used for fallback to reduce the harshness of non-motion compensated picture elements.

Processing the Output Vector Field

A consequence of vector projection is that there may be holes in the vector field. The holes are filled by a nearby assigned vector and status.

The output picture is created from a shifted mix of input pictures available. The crossfade factor controls the mix of the two input fields to create the output picture. This 'crossfade' signal takes the value 0 to 1.0 according to the following rules:

| | |
|---|---|
| Obscured background: | crossfade = 0 takes the picture from the previous picture |
| Revealed background: | crossfade = 1 takes the picture from the next picture |
| Foreground: | crossfade = dist takes the picture from both the previous and the next picture. If there are two foreground vectors then the first field is moved by the first vector to be assigned and the second vector is used to shift the second picture. |
| High errors area: | crossfade = dist fallback mode, assigned vectors equal 0 |
| Obscured background and revealed background: | this can occur when a low centre match cannot be achieved and cross face = distance has been found to work. |

Output Picture Creation

The output picture creation process steps through each element of the output picture location and applies the following algorithm:

pic_output(x/y)=pic_1(x,y shited by dist * vec_1) * (1-crossfade)+pic_2(x,y shited by (dist-1) * vec_2) *crossfade vec_1 and vec_2 are two assigned vectors, if there is only one assigned vector vec_2 is made equal to vec_1.

An interpolator has been used to create fractional pixel shifts but the exact form is still open to some optimization. This detail will effect the quality of the final pictures but is unimportant to the basic three field algorithm.

Two Field Vector Projection Algorithm

The two field algorithm gets its name from comparing only two fields during the first stage of vector assignment. The input vector menus to the two field system are vectors co-timed with the intervals between pictures rather than co-timed with pictures as required by the three field system.

Figure 4:
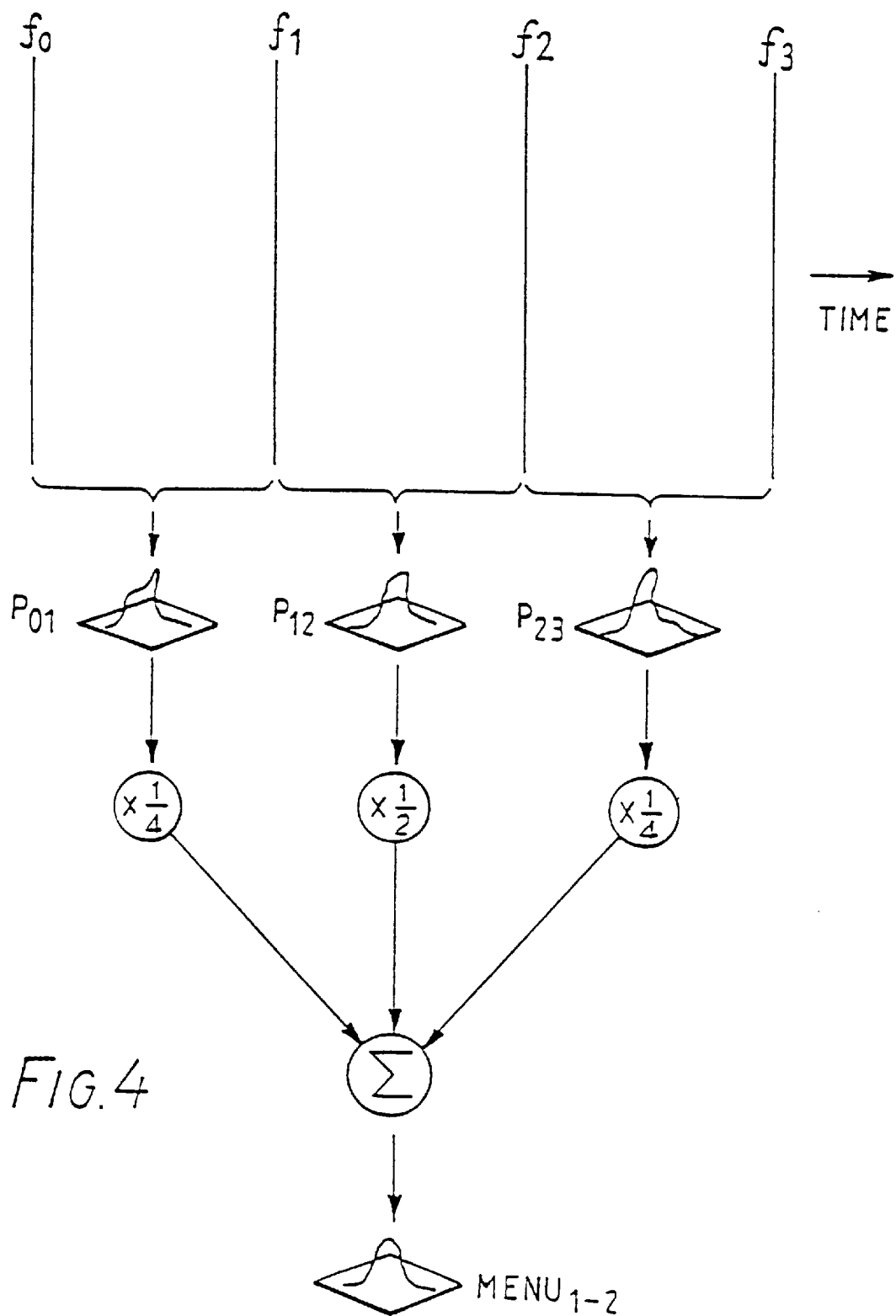
FIG. 4 is a diagram illustrating a derivation of a correlation surface by the two field algorithm.

This method is illustrated schematically in FIG. 4. This shows a sequence of four video fields $f_0$ to $f_3$. A phase correlation surface is derived for the interval between each pair of fields and these are correlation surfaces $P_{01}$, $P_{12}$ and $P_{23}$. Each of these is applicable to a particular interval. If each of these is used simply to assign vectors to the fields from which it is derived problems will occur with objects which are present in one field and not the other. Therefore, a weighted average of the three correlation surfaces is derived and then used to assign vectors for generation of images in the central interval, $f_1$ to $f_2$. In this particular example $P_{01}$ and $P_{23}$ are both given weights of one quarter and $P_{12}$ is given a weight of one half before they are all summed together to derive a temporally filtered correlation surface from which a vector menu 12 can be derived. Once vectors have been assigned the process is repeated by deriving a further correlation surface in the interval $f_3$ to $f_4$ and using this surface along with $P_{12}$ and $P_{23}$ to derive a vector menu for assignment over the interval $f_2$ to $f_3$. The process continues throughout the sequence of video images.

Thus a phase correlation surface is derived for each fields interval in the sequence of video images and these correlation surfaces are then combined in a weighted average to produce a vector menu which is applicable over a single frame interval. The fact that the menu is applicable over an interval between two fields is the reason why it is referred to as the two field algorithm.

As discussed above it is preferable for vectors to be assigned to input fields rather than to output fields and it will be appreciated that if, for example, menu$_{12}$ is assigned to $f_1$ and $f_2$ and then a menu$_{23}$ is assigned to $f_2$ and $f_3$, $f_2$ will have two vector fields assigned to it. One of these is related to $f_1$ and the other to $f_3$. These are referred to as forward and backward projection fields respectively and the use of these enables intermediate fields of the type used in slow motion sequence generation to be produced very reliably. The reason for the generation of these, and the way in which output pictures are generated, is discussed below.

The assigned vector field produced is similar to that created by the forward/backwards assignment proposed in our UK Patent Application No. 9013642.5. The forwards/backwards vector fields are stored in pairs with the attendant match error and are combined to determine the vector status.

The combined vector fields are projected forwards and backwards to output time to produce a double output timed vector field. The first output timed vector is associated with forwards projection and the second is associated with backwards projection and these are combined to control the two vector inputs to the pciture creation system.

Motion Estimation

Most of the features of the motion estimator are similar to the 'Three field' algorithm described earlier. The main difference is an follows:

Vector Menu Timing

The menu for the 'Three field' version requires vector menus that are valid for both the period before and the period after the input field instance. An even order temporal filter is used on the correlation surface to make a best estimate of this motion instance. This is a compromise that improves motion estimation when the motion is fairly continuous at the expense of measuring sudden movements and fast accelerations.

The 'Two field' algorithm uses each menu for one field period only and therefore there is no change in timing. It is more likely that a menu will be valid for one field instance than for two and hence the vector menu problem is less of a compromise.

Correlation Filter

It has been found that a particular design of temporal correlation filter will cancel problems caused by interlace when performing field rate correlations. The design of the temporal filter will preferably satisfy the condition that the sum of odd coeffiicent taps is equal to the sum of even coefficient taps. Since the most likely number of taps is three then the coefficients will be 0.25, 0.5, 0.25.

Figure 5:
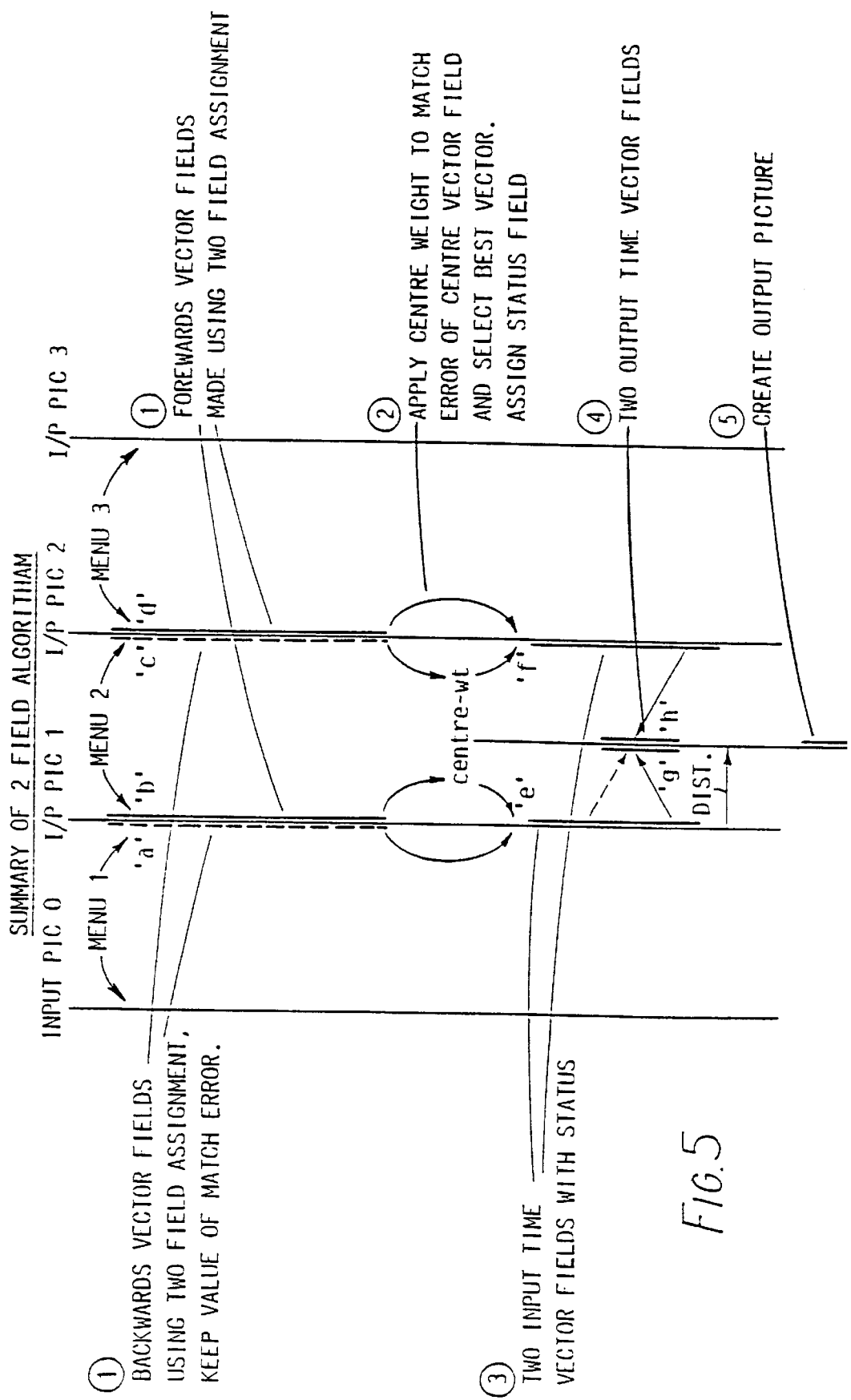
FIG. 5 is a diagram illustrating vector assignment for vector menus generated as in FIG. 4.

FIG. 5 shows in outline the two field algorithm and associated vector fields and this will be referred to in the following sections.

Input Timed Vector Field

For each menu procued by the estimator the assignment is done twice, once using forward assignment and once using backward assignment. The forward assignment is accomplished by holding the first field stationary and shifting the second by a trial vector and calculating the match error from the magnitude of the difference. The difference is divided by the gradient, this is an application of the gradient method vector measurement but the result is used for slection only, the error corresponds to a distance. It may be used for correction at some later date. The backwards projection field is created by holding the second field stationary and shifting the first and repeating the process.

Each new input field and menu produces two assigned vector fields e.g. fields b and c are created from menu 2.

Combining Input Timed Vector Fields

At this point we have four assigned vector fields, one pair for the field before the output time and one pair after output time. For each pair the first was created by backwards assigning the previous menu and the second by forwards assigning the second menu.

If the input vector field is for forwards projection then the second vector field 'b' corresponds to the centre period and is associated with foreground. The second vector field and match error has the centre_wt weighting applied and this is then compared with the outer field 'a' match error. The vector with the lowest match error is assigned. The following rules are applied when combining vector fields 'a' & 'b' to make vector field 'c':

| Centre field low: | Foreground | (status = 3) |
| Outer field low: | Obscured background | (status = 1) |
| Both match errors high: | Missing vector | (status = 5) |

The situation is similar when the input vector field is for backward projection except the centre_wt is applied to backwards assigned vector field 'c' match errors. The weighted match errors of 'c' are compared with match errors of 'd' to produce the backwards projection vector field 'f'. The rules become:

| Centre field low: | Foreground | (status = 3) |
| Outer field low: | Revealed background | (status = 2) |
| Both match errors high: | Missing vector | (status = 5) |

The combined vector fields called before and after (e and f in FIG. 5) are similar to the input timed vector fields created in the three field algorithm.

Output Timed Vector Field

Rather like the input timed vector fields, there are two vector fields associated with the output field. The first is obtained by projecting the 'before e' vector field forward and the second by projecting the 'after f' vector field backwards.

Vector Projection (Forwards)

Vector projection is achieved by visiting each location in the input vector field 'e' adding 'dist' multiplied by the assigned vector to the location of the vector and writing the vector and status into the output vector field. It is quite likely that there will be foreground/background competition to write into a particular output position. The situation can arrive when two foreground vectors arrive at the same point in space and therefore there are a simple set of rules for writing to the output vector field.

The rule is summarised as follows:

1) The whole vector array is initialised to status=0, unassigned.
2) Any vector can write to the output vector field provided its status higher than the one already present. The second vector is ignored Vector Projection (Backwards)

Vector projection from the next input field backwards to the output field position is similar to the forwards projection. The output timed backwards vector field is shown as h in the figure and the status is set to zero before projection begins. The differences is that the distance is 1−dist.

Combining Output Timed Vector Fields

The two output vector fields are combined according to another set of rules that are summarised in a table:

| Mode | Vecfield G | Vecfield H | Output vectors | Cross_fade |
|---|---|---|---|---|
| 00 | not assigned | not assigned | get nearer | get nearest |
| If nearest not assigned got fall back | | | 0,0 | dist |
| 02 | not assignd | revealed b/g | 0,0 vec_2 | 1,0 |
| 03 | not assignd | foreground | vec_2 vec_2 | dist |
| 05 | not assignd | fallback | nearest 0,0 | dist |
| 10 | obscured b/g | not assignd | vec_1 0,0 | 0.0 |
| 12 | obscured b/g | revealed b/g | vec_1 vec_2 | dist |
| 13 | obscured b/g | foreground | vec_2 vec_2 | dist |
| 15 | obscured b/g | fallback | vec_1 0,0 | dist |
| 30 | foreground | not assgnd | vec_1 vec_1 | dist |
| 32 | foreground | revealed b/g | vec_1 vec_1 | dist |
| 33 | foreground | foreground | vec_1 vec_2 | dist |
| 35 | foreground | fallback | vec_1 0,0 | dist |
| 50 | fallback | not assgnd | 0,0 get nearest | |
| 52 | fallback | revealed b/g | 0,0 vec_2 | dist |
| 53 | fallback | foreground | 0,0 vec_2 | dist |
| 55 | fallback | fallback | 0,0 0,0 | dist |

!! modes starting 4x could be crossfaded with dist or 0.5, still subject to optimisation.

After the vector processing all locations of vector g, h and crossfade factor have been filled in. A visible improvement to the output picture has been found by passing a two dimensional spatial filter over the vector field and the crossfade surface.

Output Picture Creation

The output picture creation process steps through each element of the output picture location and applies the following algorithm:

Pic_output (x,y)=pic_1(x,y shifted by dist * vec_1) * (1-crossfade)+pic_2(x,y shifted by (dist−1) * vec_2) * crossfade An interpolator has been used to create fractional pixel shifts but the exact form is still open to some optimization. The detail will effect the quality of the final pictures but is unimportant to the basic three field algorithm.

Figure 6:
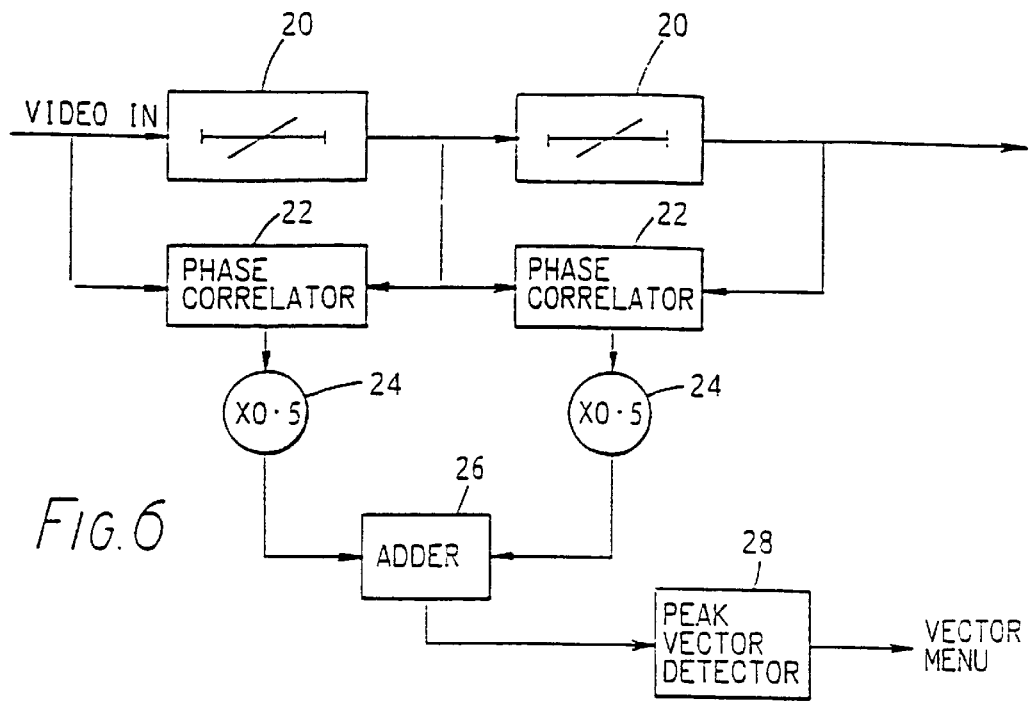
FIG. 6 is a block diagram of a circuit producing the correlation surface of FIG. 1.

FIG. 6 shows circuits for carrying out the three field algorithm. This comprises a pair of field delays 20 connected in series and receiving a sequence of video fields. The input and output of each field delay is coupled to a respective input of a phase correlation 22. Each of these produces a correlation surface representing motion between two sucessive fields. These surfaces are given equal weights of 0.5 by multiples 24 and are then combined in an adder 26. This averaged correlation surface then passes through a peak vector detector 28 which lets through only those vectors which exceed a predetermined threshold. It thereby produces a vector menu for assignation to a central field of a three field set. By the time this vector menu becomes available the input field to which it is to be assigned will be available at the output of the second or the field delays 20. The vector menu and the outputs of both field delays form inputs to an assignment unit where vectors can be assigned to the centre field of the three field sequence from which the menu was derived.

Figure 7:
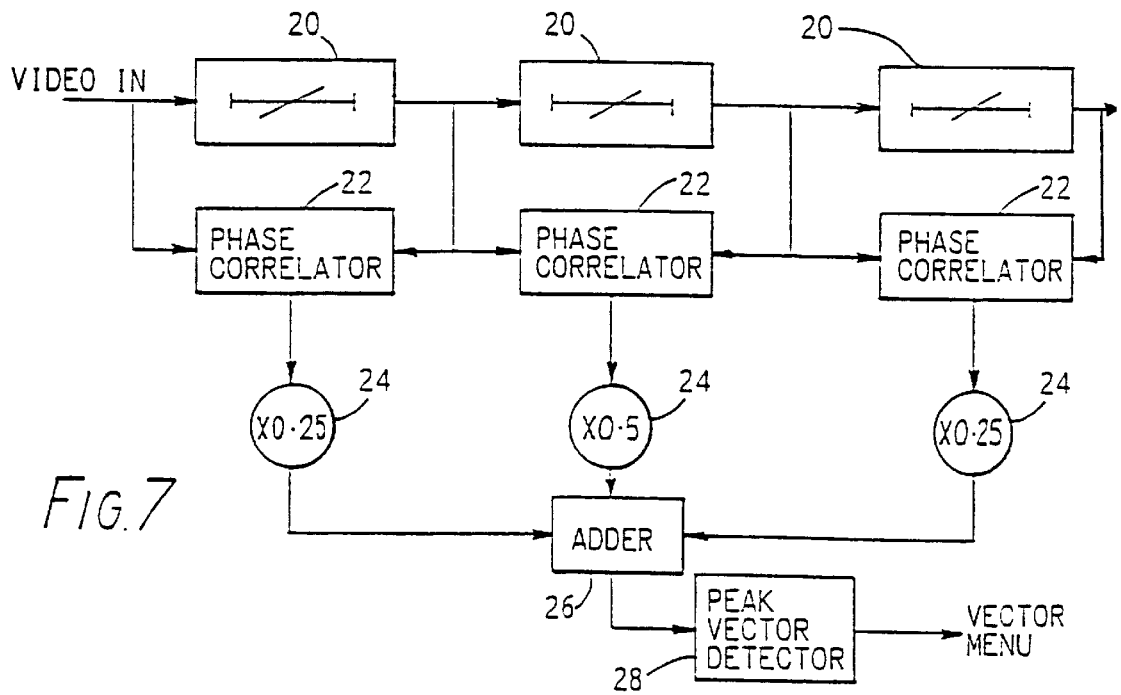
FIG. 7 is a block diagram of a circuit for producing the correlation surface of FIG. 4.

FIG. 7 is a modification of the circuitry of FIG. 6 and is suitable for carrying out the two field algorithm. It includes an additional field delay 20 in series with the other field delays. This has an associated phase correlater 22 the output of which is weighted by a fourth multiplier 21 before being combined with the outputs of the other phase correlators in adder 26. The vector menu produced and the various input fields from which it was derived inputs to an assignment unit (not illustrated).

Both the vector assignment and the temporal interpolation processes have been described without reference to interlace. The processes can be applied directly to an interlaced signal (taking account of the vertical positioning of the sampled lines); alternatively an interlaced signal can be converted to a sequential or progressive form prior to processing.

For a block diagram of a slow-motion replay system in which the invention can be incorporated, reference is made to IEE Conference Publication No. 327 (IBC'90) pages 121 to 125m, the disclosure which is hereby incorporated by reference, and to the references listed in that paper.

It will also be appreciated that the operations described above will generally be implemented by a computer system rather than by discrete circuitry. The above operational description provides all the information necessary for the production of such a system as will be readily understood by the man skilled in the art, and a detailed description of the programming blocks is therefore unnecessary and is not included here.

We claim:

1. A method of video signal motion compensation for use in a motion compensated interpolation system comprising the steps of
    deriving, for each input field, a set of motion vectors from a comparison of that field with preceding and succeeding fields,
    assigning respective ones of the vectors to individual elemental areas of the input field,
    deriving an interpolated synthesized-image output field temporally interpolated between two input fields by assigning vectors from at least one of the input fields to pixels of the output field,
    wherein certain pixels of the output field have at least two vectors assigned to them.

2. The method according to claim 1, in which, in said certain elemental areas,
    a first one of the assigned vectors is used to specify the movement of the input field to one side of the output field and
    the second assigned vector is used to specify the movement of the input field to the other side of the output field.

3. The method of claim 2, in which if two objects are determined to have an equal right to be in the output picture, the two assigned vectors are associated with the two objects respectively, and the resultant combined to form the output field.

4. The method according to claim 2, in which the assignment is made by simultaneously comparing the contents of three input frames.

5. The method according to claim 1, in which in said certain elemental areas no valid movement determination can be made, and in which a first one of the assigned vectors corresponds to a fall back mode and the second one of the assigned vectors corresponds to a vector from an adjacent measurement block.

6. The method according to claim 1, in which two predictions for the value of said certain elemental areas are made on the basis of the two assigned vectors, and the two resultants are combined by a simple or weighted average.

7. The method according to claim 6, in which the combination is made in dependence upon a time-dependent coefficient.

8. The method according to claim 1, in which motion vectors are derived for each of a plurality of blocks of a picture, and the thus-derived vectors are selected to provide plurality of vectors for said picture or sections thereof.

9. The method according to claim 1, in which the vectors are derived by a phase correlation technique.

10. The method according to claim 1, in which two vector fields are assigned to an input field, a first vector field being assigned by backward projection to a preceding input field and a second input field being assigned by forward projection to a succeeding input field.

11. The method according to claim 1, in which elemental areas with at least two vectors assigned to them have these vectors assigned from different sets of motion vectors.

12. The method according to claim 1, in which at least two vectors are assigned to each elemental area of an input field.

13. The method according to claim 1, in which a first vector assigned to an elemental area of an input field is derived by backwards projection to a preceding input field and a second vector assigned to the same elemental area is derived by forward projection to a succeeding input field.

14. The method according to claim 1, in which said set of motion vectors composes an average of the sets of motion vectors derived from comparisons between said input field and the input fields immediately preceding and immediately succeeding it.

15. The method according to claim 14, in which the average is a weighted average.

16. The method according to claim 1, in which the vector deriving step comprises the steps of deriving a first set of motion vectors by comparing a first and a second input field, deriving a second set of motion vectors by comparing the second and a third input field, and deriving a third set of vectors from said first and second sets.

17. The method according to claim 16, in which the input fields are successive fields in a sequence.

18. The method according to claim 16, including the step of assigning the vectors of the third set to elemental areas of the picture.

19. The method according to claim 16, in which the assigning step comprises assigning the vectors of the third set to elemental areas of the picture in the second input field.

20. The method according to claim 1, in which the vector deriving step comprises the steps of deriving first, second and third sets of motion vectors from first and second, second and third, and third and fourth input fields and deriving a fourth set of motion vectors from said first, second and third sets.

21. The method according to claim 20, in which the fourth set of motion vectors is derived from an average of said first, second and third sets.

22. The method according to claim 21, in which the average is a weighted average.

23. The method according to claim 22, in which the input fields are successive fields in a sequence.

24. The method according to claim 22, including the step of assigning vectors of the fourth set to elemental areas in a picture represented by the video signal.

25. The method according to claim 24, in which the vectors are assigned to elemental areas of the second and third input fields.

26. The method according to claim 25, in which vectors are assigned to the second input field by a forward projection technique, and vectors are assigned to the third input field by a backward projection technique.

27. The method according to claim 22, including the step of repeating the process for the second, third, fourth, and a fifth input field and thus deriving a fifth and a sixth set of motion vectors.

28. The method according to claim 22, in which the sets of motion vectors are derived by a phase correlation technique.

29. A method of video signal motion compensation for use in a video signal motion compensation system comprising the steps of deriving, for each input field, a set of motion vectors from a comparison of that field with preceding and succeeding fields, assigning respective ones of the vectors to individual elemental areas of the input field, deriving an output field between two input fields by assigning vectors from at least one of the input fields to elemental areas of the output field, wherein certain elemental areas of the output field have at least two vectors assigned to them, and in which one of the assigned vectors is associated with a first image portion and a second of the assigned vectors is associated with a second image portion moving differently from the first, the corresponding output image portion being formed of a combination of the resultant of the two vectors on the respective input image portions, to give the appearance of blurring at the edge of a moving object.

30. An apparatus for video motion compensation for use in a motion compensated interpolation system, comprising:

vector deriving means for deriving a plurality of motion vectors, for each of a plurality of blocks of each input field, from a comparison of the input field with preceding and succeeding input fields;

vector assignment means for assigning respective ones of the vectors to individual pixels of the input field; and means for deriving a n interpolated synthesized-image output field by assigning vectors from at least one of the input fields to pixels of the output field;

wherein certain pixels have at least two valid vectors assigned to them.

\* \* \* \* \*

UNITED STATES PATENT AND TRADEMARK OFFICE
CERTIFICATE OF CORRECTION

PATENT NO. : 6,011,596 Page 1 of 1
DATED : January 4, 2000
INVENTOR(S) : Burl et al.

It is certified that error appears in the above-identified patent and that said Letters Patent is hereby corrected as shown below:

<u>Title page,</u>
Item [73], should read: -- Assignee: British Broadcasting Corporation, London, United Kingdom --
Item [30], Foreign Application Priority Data, first reference should read:
-- May 26, 1991   [PCT]   PCT/GB92/00952 --

Signed and Sealed this

Twenty-first Day of January, 2003

JAMES E. ROGAN
*Director of the United States Patent and Trademark Office*